US012810309B2

(12) United States Patent
Yeung

(10) Patent No.: US 12,810,309 B2
(45) Date of Patent: Nov. 24, 2026

(54) SYSTEM AND METHOD FOR GENERATION AND DISTRIBUTION OF DIGITAL COLLECTIBLES OF PHYSICAL OBJECTS PROTECTED BY CRYPTOGRAPHIC DIGITAL TOKENS

(71) Applicant: Benjamin Yeung, Bradbury, CA (US)

(72) Inventor: Benjamin Yeung, Bradbury, CA (US)

( * ) Notice: Subject to any disclaimer, the term of this patent is extended or adjusted under 35 U.S.C. 154(b) by 340 days.

(21) Appl. No.: 18/207,745

(22) Filed: Jun. 9, 2023

(65) Prior Publication Data

US 2023/0410126 A1 Dec. 21, 2023

Related U.S. Application Data

(60) Provisional application No. 63/352,803, filed on Jun. 16, 2022.

(51) Int. Cl.
*G06Q 30/018* (2023.01)

(52) U.S. Cl.
CPC ....... *G06Q 30/018* (2013.01); *G06Q 2220/10* (2013.01)

(58) Field of Classification Search
CPC ........ G06Q 30/018
USPC ........ 705/51
See application file for complete search history.

(56) References Cited

U.S. PATENT DOCUMENTS

2017/0024817 A1* 1/2017 Wager .................... G06Q 40/04
2021/0319429 A1* 10/2021 Yantis .................. G06Q 20/123
2022/0261882 A1* 8/2022 Youb ................... G06F 16/1805

* cited by examiner

*Primary Examiner* — John W Hayes
*Assistant Examiner* — Cristina Owen Sherr
(74) *Attorney, Agent, or Firm* — troutman pepper locke; Tim Tingkang Xia, Esq.

(57) ABSTRACT

A system for generation and distribution of digital collectibles of a physical object over distributed computing network includes distributed ledgers and computing devices operably coupled to the distributed ledgers. The computing devices are configured to: generate a digital representation of the physical object; partition the digital representation into a plurality of pieces, each piece uniquely representing a respective portion of the physical object; generate a plurality of digital tokens for the plurality of pieces of the digital representation, each digital token including a token identifier associated uniquely with a respective piece of the digital representation; cryptographically link each digital token to the respective piece of the digital representation on the distributed ledgers, such that each digital token represents the respective piece of the digital representation; and associate ownership of each digital token to an account of an owner of the respective piece of the digital representation on the distributed ledgers.

34 Claims, 4 Drawing Sheets

100

SYSTEM AND METHOD FOR GENERATION AND DISTRIBUTION OF DIGITAL COLLECTIBLES OF PHYSICAL OBJECTS PROTECTED BY CRYPTOGRAPHIC DIGITAL TOKENS

CROSS-REFERENCE TO RELATED PATENT APPLICATION

This application claims priority to and the benefit of U.S. Provisional Patent Application Ser. No. 63/352,803 filed Jun. 16, 2022, which is incorporated herein in its entirety by reference.

FIELD OF THE INVENTION

This invention relates to systems and methods for generation and distribution of digital collectibles of physical objects protected by cryptographic digital tokens over distributed networks.

BACKGROUND OF THE INVENTION

Nowadays, more and more people are enjoying collections of artworks, antiques and other collectible goods as investments and/or personal interest. However, some of the artworks, antiques and other collectible goods may be worth of a few hundred thousand dollars, even millions dollars or more, which are very expansive to ordinary people who cannot afford. Thus, it would be beneficial and desirable for ordinary people to have systems/platforms in which they are able to own and trade one or more portions/pieces of artworks, antiques and other collectible goods so that they can enjoy ownership of pieces of artworks, antiques and other collectible goods, and rewards thereof.

SUMMARY OF THE INVENTION

In view of the foregoing, one of the objectives of this invention is to provide a system/platform and method for generation and distribution of digital collectibles of a physical object over a distributed computing network, which allows people to own, transfer, and/or trade one or more portions/pieces of artworks, antiques and other collectible goods in which they are interested.

In one aspect, the system comprises at least one distributed ledger; and one or more computing devices operably coupled to the at least one distributed ledger.

The one or more computing devices are configured to: generate a digital representation of the physical object; partition the digital representation of the physical object into a plurality of pieces, wherein each piece of the digital representation uniquely represents a respective portion of the physical object; generate a plurality of digital tokens for the plurality of pieces of the digital representation, wherein each digital token includes a token identifier that is associated uniquely with a respective piece of the digital representation; cryptographically link each digital token to the respective piece of the digital representation of the physical object on the at least one distributed ledger, such that each digital token represents the respective piece of the digital representation of the physical object; and associate ownership of each digital token to an account of an owner of the respective piece of the digital representation of the physical object on the at least one distributed ledger.

The at least one distributed ledger is configured to store a plurality of public addresses, each respective public address corresponding to a respective account of a respective user; the plurality of pieces of the digital representation of the physical objects; and the plurality of digital tokens corresponding to the plurality of pieces of the digital representation, and ownership of each respective token.

In one embodiment, the digital representation is generated based on information of the physical object received over the distributed computing network from a remote computing node.

In one embodiment, the information of the physical object comprises a description including physical attributes, origination attributes, creator attributes, GPS position and age of the physical object, one or more images of the physical object, and/or one or more animations of the physical object.

In one embodiment, the one or more computing devices are further configured to transfer the ownership of one or more pieces of the digital representation of the physical object from a first party to a second party.

In one embodiment, the one or more computing devices are further configured to: receive a transfer request of the one or more pieces of the digital representation of the physical object from the first party to the second party; determine a unique owner identification (ID) code associated with the second party; link the one or more pieces of the digital representation of the physical object with the unique owner ID code of the second party; and transmit one or more digital tokens of the one or more pieces of the digital representation of the physical object and the unique owner ID code of the second party to record a transfer of the one or more pieces of the digital representation of the physical object to the second party on a transaction block.

In one embodiment, the transfer request includes one or more token identifiers that identify the one or more digital tokens and a public address of the requester.

In one embodiment, the one or more computing devices are further configured to update the at least one distributed ledger with the transaction block that includes the ownership indicating that the one or more digital tokens corresponding to the one or more pieces of the digital representation of the physical object are owned by the second party in response to the transfer.

In one embodiment, the one or more computing devices are further configured to generate a smart contract that governs ownership of the plurality of digital tokens in connection with the plurality of pieces of the digital representation.

In one embodiment, the smart contract defines whether the one or more pieces of the digital representation are transferable from the first party to the second party, if the smart contract allows transfers of the one or more pieces of the digital representation, the smart contract further includes one or more conditions that when met, cause the smart contract to initiate a transfer of the one or more pieces of the digital representation from the first party to the second party.

In one embodiment, the smart contract updates the at least one distributed ledger to indicate a change in the ownership of the one or more pieces of the digital representation in response to the one or more conditions being met.

In one embodiment, the smart contract updates the ownership of the one or more digital tokens on the at least one distributed ledger to assign the one or more digital tokens to an account of the second party of the one or more pieces of the digital representation in response to the transfer.

In one embodiment, the plurality of digital tokens is redeemable by an owner of the plurality of pieces of the digital representation once the owner purchases all the plurality of pieces of the digital representation, whereby redemption of the plurality of digital tokens allows the owner of the plurality of pieces of the digital representation to take possession of the physical object.

In one embodiment, the one or more computing devices comprise an object management system configured to generate the digital representation of the physical object based on the information of the physical object.

In one embodiment, the one or more computing devices comprise a digital token generation system configured to: generate a plurality of digital tokens for the plurality of pieces of the digital representation; and generate a cryptographic link of each digital token to the respective piece of the digital representation of the physical object on the at least one distributed ledger, such that each digital token represents the respective piece of the digital representation of the physical object.

In one embodiment, the one or more computing devices comprise a ledger update system configured to write the plurality of digital tokens to the at least one distributed ledger in accordance with a protocol, thereby facilitating transactions for the plurality of pieces of the digital representation of the physical object using the plurality of digital tokens.

In one embodiment, the system further comprises a digital market platform configured to facilitate transactions for one or more of the plurality of digital tokens on behalf of sellers and to instruct the ledger update system to update the ownership of the one or more of the plurality of digital tokens in response to the transactions.

In one embodiment, the digital market platform comprises a graphical user interface (GUI) for parties to view visualizations of the digital representation of the physical object; and transact for one or more pieces of the digital representation by purchasing one or more digital tokens of the plurality of digital tokens corresponding to one or more pieces of the digital representation.

In one embodiment, said purchasing one or more digital tokens of the plurality of digital tokens is through auction, push notifications, and/or websites.

In one embodiment, each digital token is a non-fungible token (NFT).

In one embodiment, the at least one distributed ledger is maintained by the one or more computer devices.

In one embodiment, the at least one distributed ledger is a blockchain, wherein the blockchain is a private blockchain or a public blockchain.

In one embodiment, the physical object is a physical good, a collectible artwork and an antique.

In another aspect, the method comprises: generating a digital representation of the physical object; partitioning the digital representation of the physical object into a plurality of pieces, wherein each piece of the digital representation uniquely represents a respective portion of the physical object; generating a plurality of digital tokens for the plurality of pieces of the digital representation, wherein each digital token includes a token identifier that is associated uniquely with a respective piece of the digital representation; cryptographically linking each digital token to the respective piece of the digital representation of the physical object on a distributed ledger, such that each digital token represents the respective piece of the digital representation of the physical object; and associating ownership of each digital token to an account of an owner of the respective piece of the digital representation of the physical object on the distributed ledger.

In one embodiment, said generating the digital representation comprises: receiving information of the physical object; and generating the digital representation of the physical object based on the information of the physical object.

In one embodiment, the information of the physical object comprises a description including physical attributes, origination attributes, creator attributes, GPS position and age of the physical object, one or more images of the physical object, and/or one or more animations of the physical object.

In one embodiment, the method further comprises transferring the ownership of one or more pieces of the digital representation of the physical object from a first party to a second party.

In one embodiment, said transferring the ownership of the one or more pieces of the digital representation of the physical object comprises: receiving a transfer request of the one or more pieces of the digital representation of the physical object from the first party to the second party; determining a unique owner identification (ID) code associated with the second party; linking the one or more pieces of the digital representation of the physical object with the unique owner ID code of the second party; and transmitting one or more digital tokens of the one or more pieces of the digital representation of the physical object and the unique owner ID code of the second party to record a transfer of the one or more pieces of the digital representation of the physical object to the second party on a transaction block.

In one embodiment, the transfer request includes one or more token identifiers that identify the one or more digital tokens and a public address of the requester.

In one embodiment, said transferring the ownership of the one or more pieces of the digital representation of the physical object further comprises updating the distributed ledger with the transaction block that includes the ownership indicating that the one or more digital tokens corresponding to the one or more pieces of the digital representation of the physical object are owned by the second party in response to the transfer.

In one embodiment, the method further comprises generating a smart contract that governs ownership of the plurality of digital tokens in connection with the plurality of pieces of the digital representation.

In one embodiment, the smart contract defines whether the one or more pieces of the digital representation are transferable from the first party to the second party, if the smart contract allows transfers of the one or more pieces of the digital representation, the smart contract further includes one or more conditions that when met, cause the smart contract to initiate a transfer of the one or more pieces of the digital representation from the first party to the second party.

In one embodiment, the smart contract updates the distributed ledger to indicate a change in the ownership of the one or more pieces of the digital representation in response to the one or more conditions being met.

In one embodiment, the smart contract updates the ownership of the one or more digital tokens on the distributed ledger to assign the one or more digital tokens to an account of the second party of the one or more pieces of the digital representation in response to the transfer.

In one embodiment, the plurality of digital tokens is redeemable by an owner of the plurality of pieces of the digital representation once the owner purchases all the plurality of pieces of the digital representation, whereby redemption of the plurality of digital tokens allows the owner of the plurality of pieces of the digital representation to take possession of the physical object.

In one embodiment, the method further comprises providing, by a digital market platform, a graphical user interface (GUI) for parties to view visualizations of the digital representation of the physical object; and transact for one or more pieces of the digital representation by purchasing one or more digital tokens of the plurality of digital tokens corresponding to one or more pieces of the digital representation.

In one embodiment, said purchasing one or more digital tokens of the plurality of digital tokens is through auction, push notifications, and/or websites.

In one embodiment, the distributed ledger is configured to store a plurality of public addresses, each respective public address corresponding to a respective account of a respective user; the plurality of pieces of the digital representation of the physical objects; and the plurality of digital tokens corresponding to the plurality of pieces of the digital representation, and ownership of each respective token.

In one embodiment, each digital token is a non-fungible token (NFT).

In one embodiment, the distributed ledger is maintained by the one or more computer devices.

In one embodiment, the distributed ledger is a blockchain, wherein the blockchain is a private blockchain or a public blockchain.

In one embodiment, the physical object is a physical good, a collectible artwork and an antique.

In yet another aspect, the invention relates to a non-transitory tangible computer-readable medium storing instructions which, when executed by one or more processors, cause one or more computing devices to perform the above methods for tokenization of a physical object over a distributed computing network.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
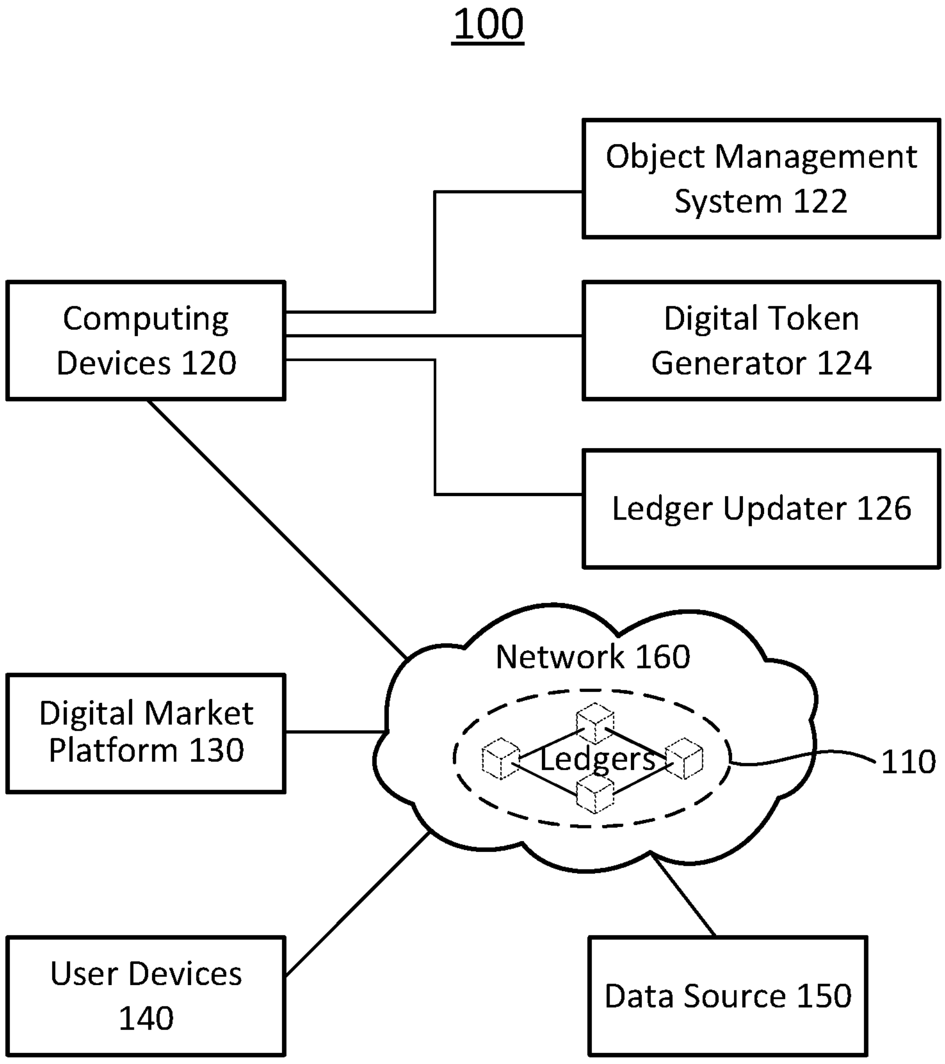
FIG. 1 shows a schematic diagram of a system for generation and distribution of digital collectibles of a physical object over a distributed computing network according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

As used herein, the term "non-fungible token" or its abbreviation "NFT" refers to a type of assets including digital data stored in a blockchain, i.e., a form of distributed ledger, and is used as an irrevocable digital certificate of ownership and authenticity for a given asset, whether digital or physical. It cannot be copied, substituted, or subdivided. The ownership of an NFT is recorded in the blockchain, and can be transferred by the owner, allowing NFTs to be sold and traded.

The systems and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this invention. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Aspects of this invention are directed to systems and methods for generation and distribution of computer-generated digital collectibles that are linked with real-world, physical objects, such as tangible artworks, antiques and physical goods, and are protected by cryptographic digital tokens over a distributed computing network.

Referring to FIG. 1, the system 100 in some embodiments includes one or more distributed ledgers 110; and one or more computing devices 120 operably coupled to the one or more distributed ledgers 110. The system 100 also includes, but is not limited to, a market platform 130, one or more user devices 140, and external data source 150. All these components are in commutations with each other through one or more distributed computing networks 160.

The distributed ledger 110 is configured to store a plurality of public addresses, each respective public address corresponding to a respective account of a respective user; the plurality of pieces of the digital representation of the physical objects; and the plurality of digital tokens corresponding to the plurality of pieces of the digital representation, ownership of each respective token, smart contracts, and the likes. In some embodiments, the distributed ledger 110 is maintained by the one or more computer devices 120. In some embodiments, the distributed ledger is a blockchain, which is a private blockchain or a public blockchain.

The one or more computing devices 120 in some embodiments are distributed node computing devices. Each distributed node computing device has each having one or more processors, and may be corresponding to one node in the computing networks 160.

In some embodiments, the one or more computing devices 120 operate as an open, yet encrypted peer-to-peer network in which transaction records, e.g., "blocks", are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic") digital asset registered to the platform.

Figure 2:
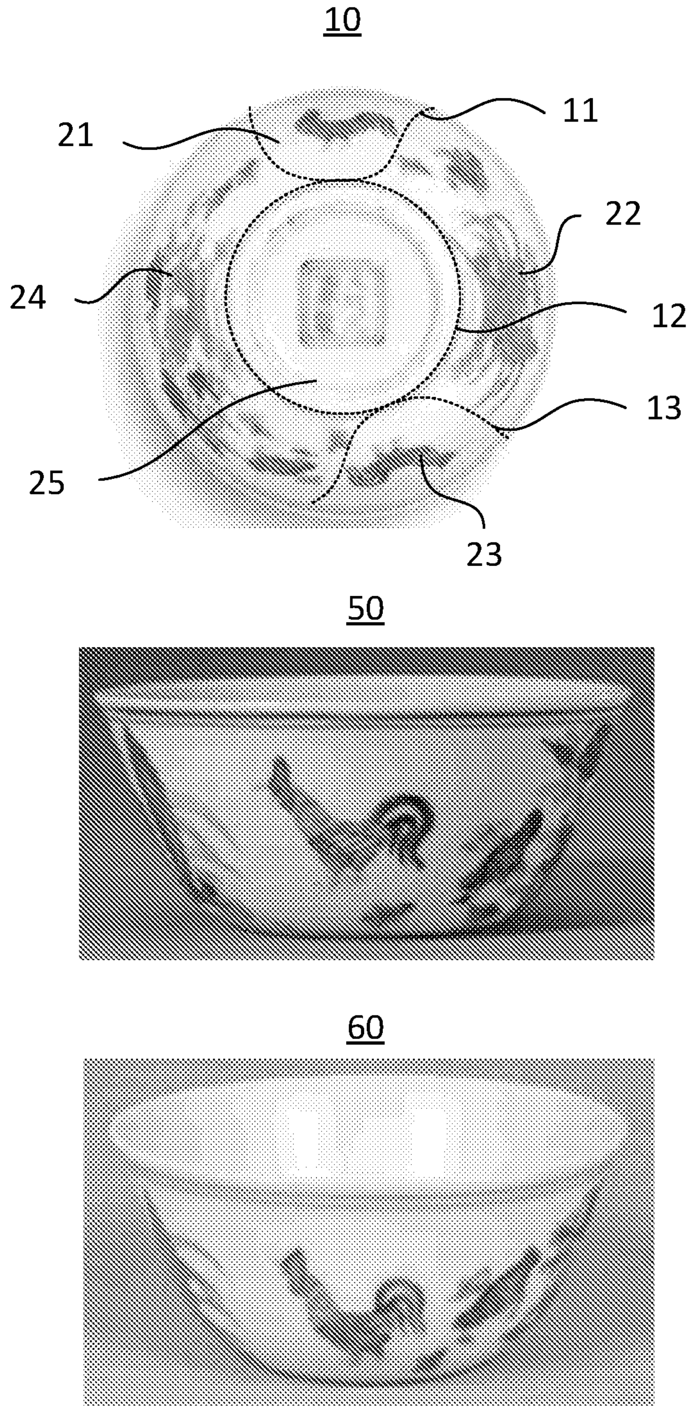
FIG. 2 shows photographs of different views of an antique chicken bowl.

The one or more computing devices 120 in some embodiments are configured to: generate a digital representation of the physical object. In some embodiments, the digital representation is generated based on information of the physical object, which is received over the distributed computing network 160 from a remote computing node, for example, an external data source 150. The data source 150 in one embodiment is a distributed data storage platform that stores the information of the physical object. The information of the physical object may include, but is not limited to, a description including physical attributes, origination attributes, creator attributes, a GPS position, and an age of the physical object, one or more images of the physical object, and/or one or more animations of the physical object. The GPS position information indicates the place at which the physical object is located. The one or more images may include photographs, as shown in FIG. 2 which are photographs 10, 50 and 60 of different views of an antique chicken bowl. The images can also be constructed from high-spectral data, holographic data, optic scan data, X-rays scan data, computed tomography (CT) scan data, and the likes. Generally, all the information is acquired to uniquely identify the physical object, which includes metadata such as descriptive metadata, structural metadata, administrative metadata, reference metadata, and/or legal metadata. The digital representation includes a data structure that uniquely identity the physical object. The digital representation can be of a multimodal digital identity of the physical object. The multimodal digital identity construction of the physical object may be subjected to three-dimensional model construction from multimodal data such as high-spectral data, holographic data, optic scan data, X-rays scan data, and/or CT scan data of the physical object. In some embodiments, the digital representation also includes a unique identifier distributed in the blockchain ledgers 110.

Once the digital representation of the physical object is generated and available, the one or more computing devices 120 can partition/segment/fragment the digital representation into a plurality of pieces based on instructions. The instructions may include how many pieces into which the digital representation is partitioned, partitioning patterns (e.g., structures and/or designs on the physical object) and sizes, and so on. Each piece of the digital representation uniquely represents a respective portion of the physical object. In other words, a piece of the digital representation is one-to-one corresponding to the respective portion of the physical object only. Taking photograph 10 of FIG. 2 as an example, dotted lines 11, 12 and 13 partition a digital representation 10 of the antique chicken bowl into five (5) digital pieces 21, 22, 23, 24 and 25 based on the unique features of the antique chicken bowl. For example, each of the digital pieces 21 and 23 contains a different painted chicken, and each of the digital pieces 22 and 24 includes different painted flowers, while the digital piece 25 has a seal. Each of the five digital pieces 21, 22, 23, 24 and 25 of the digital representation 10 is uniquely corresponding to a respective physical portion of the antique chicken bowl, respectively. It should be noted that the partition, segmentation or fragmentation of the digital representation into the plurality of pieces virtually divides the digital representation of the physical object into the plurality of digital piece assets based on the instructions, and does not physically divide the physical object.

Further, the one or more computing devices 120 may generate a plurality of digital tokens for the plurality of pieces of the digital representation. Each digital token includes a token identifier that is associated uniquely with a respective piece of the digital representation. The generation of the digital tokens usually involves using a smart contract to mint the digital tokens on a chosen blockchain, which acts as a distributed ledger, and storing the digital tokens on the distributed ledger. Minting refers to the process of creating the unique digital tokens each of which represents a digital asset, i.e., a piece of the digital representation. This typically involves providing the necessary details and metadata for the digital tokens, such as the title, description, image or media file, and any other relevant information. Once minted, the digital tokens are stored on the distributed ledger. The blockchain ensures that the ownership and transaction history of the digital tokens are securely recorded and verifiable. In some embodiments, the smart contract defines, among other things, the rules and functionality of digital tokens, including ownership, transferability, royalties, and any additional attributes or metadata.

According to the invention, each digital token is a non-fungible token (NFT). Generally, the term "digital token(s)" or simply "token(s)", used in the disclosure, refers to NFTs only, and do not include fungible tokens. The digital tokens are tradable, transferable and/or redeemable. Whenever the tokens are traded, transferred and/or redeemed, the ownership of the respective pieces of the digital representation associated with the tokens is changed in the distributed ledger.

In addition, the one or more computing devices 120 may cryptographically link each digital token to the respective piece of the digital representation of the physical object on the at least one distributed ledger, such that each digital token represents the respective piece of the digital representation of the physical object; and associate ownership of each digital token to an account of an owner of the respective piece of the digital representation of the physical object on the at least one distributed ledger.

In some embodiments, cryptographically linking an NFT to a respective piece of the digital representation of the physical object on the at least one distributed ledger involves associating the unique identifier or token ID of each digital token with the corresponding entry in the smart contract. This linkage establishes the connection between each digital token and the distributed ledger. With the digital tokens linked to the distributed ledger, users can buy, sell, trade, or transfer ownership of the digital tokens through interactions with the smart contract. These interactions are typically executed through blockchain wallets or NFT marketplaces.

In some embodiments, one unique feature of the invention is that a digital token is one-to-one-only cryptographically linked to a respective piece of the digital representation of the physical object, and vice versus. That is, a digital token is cryptographically linked to only one single piece of the digital representation, and alternatively, a piece of the digital representation is tokenized with only one single digital token. Such a unique feature ensures each piece of the digital representation can only have a single ownership represented by its unique digital token at the same time, and avoids a single piece of the digital representation to have multiple ownerships at the same time, which ensures the ownership and control of each piece of the digital representation correspond to the ownership and control of the respective portion of the physical object.

In some embodiments, the one or more computing devices 120 are further configured to transfer the ownership of one or more pieces of the digital representation of the physical object from a first party to a second party.

In some embodiments, the one or more computing devices 120 are further configured to: receive a transfer request of the one or more pieces of the digital representation of the physical object from the first party to the second party; determine a unique owner identification (ID) code associated with the second party; link the one or more pieces of the digital representation of the physical object with the unique owner ID code of the second party; and transmit one or more digital tokens of the one or more pieces of the digital representation of the physical object and the unique owner ID code of the second party to record a transfer of the one or more pieces of the digital representation of the physical object to the second party on a transaction block.

In some embodiments, the transfer request includes one or more token identifiers that identify the one or more digital tokens and a public address of the requester.

In some embodiments, the one or more computing devices 120 are further configured to update the distributed ledger with the transaction block that includes the ownership indicating that the one or more digital tokens corresponding to the one or more pieces of the digital representation of the physical object are owned by the second party in response to the transfer.

In some embodiments, the one or more computing devices 120 are further configured to generate a smart contract that governs ownership of the plurality of digital tokens in connection with the plurality of pieces of the digital representation. Generally, the smart contract defines the rules and conditions that govern a particular agreement or transaction. These rules are programmed in the form of code, specifying the actions to be taken when certain conditions are met. Once deployed on the blockchain, the smart contract operates autonomously and executes automatically based on the predetermined conditions.

In some embodiments, the smart contract defines the rules and conditions of which a digital token is one-to-one-only cryptographically linked to a respective piece of the digital representation of the physical object, and vice versus. That is, a digital token is cryptographically linked to only one single piece of the digital representation, and alternatively, a piece of the digital representation is tokenized with only one digital token. Such a unique feature ensures each piece of the digital representation can only have a single ownership represented by its unique digital token at the same time, and avoids a single piece of the digital representation to have multiple ownerships at the same time, which ensures the ownership and control of each piece of the digital representation correspond to the ownership and control of the respective portion of the physical object.

In some embodiments, the smart contract defines whether the one or more pieces of the digital representation are transferable from the first party to the second party, if the smart contract allows transfers of the one or more pieces of the digital representation, the smart contract further includes one or more conditions that when met, cause the smart contract to initiate a transfer of the one or more pieces of the digital representation from the first party to the second party.

In some embodiments, the smart contract updates the distributed ledger to indicate a change in the ownership of the one or more pieces of the digital representation in response to the one or more conditions being met.

In some embodiments, the smart contract updates the ownership of the one or more digital tokens on the distributed ledger to assign the one or more digital tokens to an account of the second party of the one or more pieces of the digital representation in response to the transfer.

In some embodiments, the plurality of digital tokens is redeemable by an owner of the plurality of pieces of the digital representation once the owner purchases all the plurality of pieces of the digital representation, whereby redemption of the plurality of digital tokens allows the owner of the plurality of pieces of the digital representation to take possession of the physical object.

In some embodiments, the one or more computing devices 120 comprise an object management system 122, configured to generate the digital representation of the physical object based on the information of the physical object.

In some embodiments, the one or more computing devices 120 comprise a digital token generator 124 configured to: generate a plurality of digital tokens for the plurality of pieces of the digital representation; and generate a cryptographic link of each digital token to the respective piece of the digital representation of the physical object on the distributed ledger, such that each digital token represents the respective piece of the digital representation of the physical object.

In some embodiments, the one or more computing devices 120 comprise a ledger updater 126 configured to write the plurality of digital tokens to the distributed ledger in accordance with a protocol, thereby facilitating transactions for the plurality of pieces of the digital representation of the physical object using the plurality of digital tokens.

In some embodiments, the digital market platform 130 is configured to facilitate transactions for one or more of the plurality of digital tokens on behalf of sellers and to instruct the ledger update system to update the ownership of the one or more of the plurality of digital tokens in response to the transactions. In one embodiment, the digital market platform 130 comprises a graphical user interface (GUI) for parties/users, e.g., from user devices 140, to view visualizations of the digital representation of the physical object; and transact for one or more pieces of the digital representation by purchasing one or more digital tokens of the plurality of digital tokens corresponding to one or more pieces of the digital representation. The user devices 140 can be, but are not limited to, smart phones, smart watches, laptop computers, desktop computers, tablet computers and other suitable personal computing device. Each user device 140 may include a digital wallet of the user. The digital wallet is used to store the tokens of the user. The digital wallet may be a client application that is provided and/or supported by the blockchain ledger 110. In some embodiments, the digital wallet stores any tokens that are owned by the user associated with the digital wallet and provides an interface that allows the user to redeem, transfer, sell, exchange, or otherwise participate in transactions involving the token.

In some embodiments, said purchasing one or more digital tokens of the plurality of digital tokens is through online auction, push notifications, and/or websites.

One should appreciate that the disclosed systems and techniques provide many advantageous technical effects including construction and storage of a digital asset blockchain representing user-to-user transactions of virtual collectibles associated with real-world products. Construction and storage of a digital asset blockchain enables networked computing devices to quickly and efficiently generate, validate and transact digital asset data, thereby improving the performance of the individual computing devices. A decentralized network of interconnected computing nodes may function as a "supercomputer" that has access to many parallel processors, coordinating the assignment and reassembly of various chunks of computation. In so doing, the network is more computationally efficient, rapid, and inexpensive than a centralized computing system or a single processing farm. In the same vein, decentralized storage provides each individual computing node with tremendous storage capacity that is limited only by the number of peer devices and their cumulative available memory space.

Figure 3:
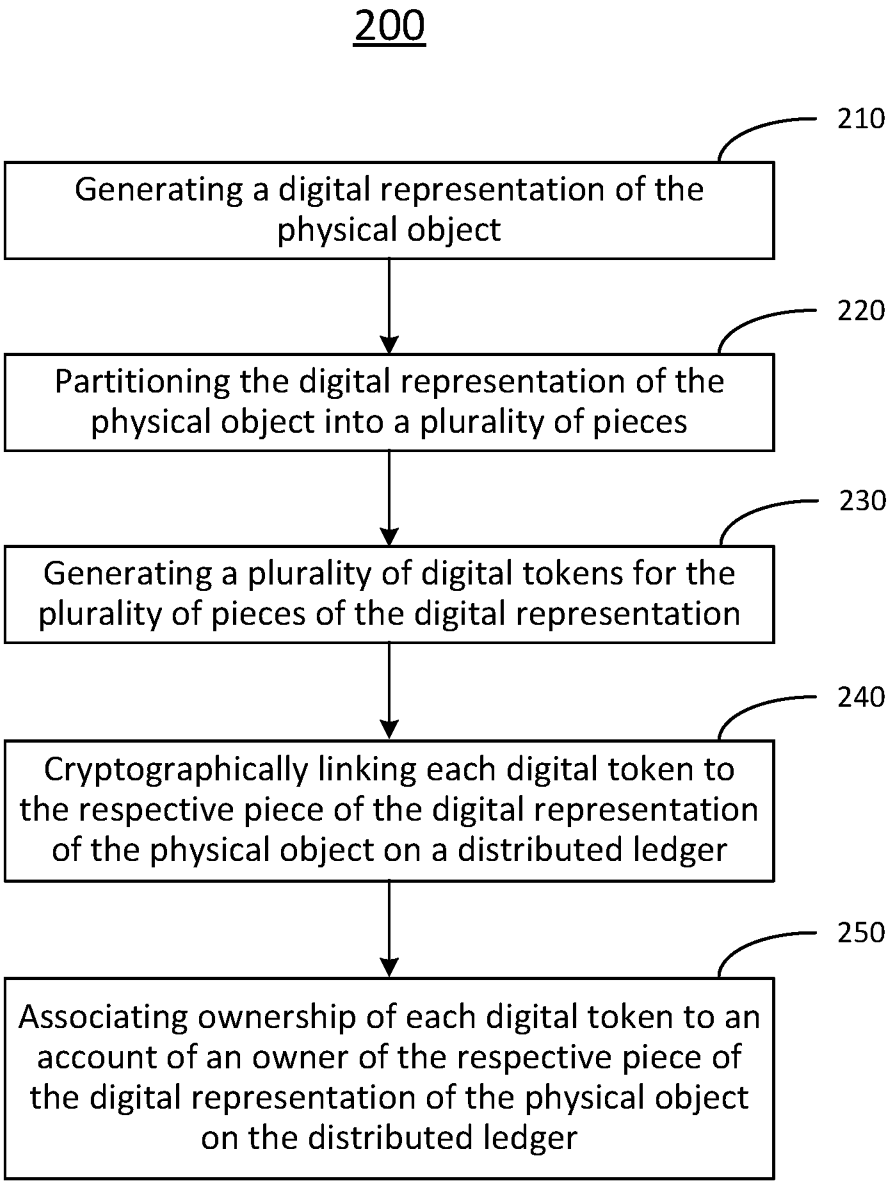
FIG. 3 shows a schematic diagram of a system for generation and distribution of digital collectibles of a physical object over a distributed computing network according to embodiments of the invention.

With reference now to the flow chart of FIG. 3, a method 200 for generation and distribution of digital collectibles of a physical object over a distributed computing network is generally described in accordance with aspects of the invention. Some or all of the operations illustrated in FIG. 3 and described in further detail below may be representative of an algorithm that corresponds to processor-executable instructions that may be stored, for example, in main or auxiliary or remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

The method in some embodiments includes the following operations. It should be understood that one or more operations within a method may be executed in different order (or concurrently) without altering the principles of the invention.

At operation 210, a digital representation of the physical object is generated by, for example, the computing devices 120 of FIG. 1. In some embodiments, said generating the digital representation is performed by receiving information of the physical object from the data source; and generating the digital representation of the physical object based on the information of the physical object. In some embodiments, the information of the physical object, which may include, but is not limited to, a description including physical attributes, origination attributes, creator attributes, a GPS position, and an age of the physical object, one or more images of the physical object, and/or one or more animations of the physical object. The GPS position information indicates the place at which the physical object is located. The one or more images may include photographs, as shown in FIG. 2 which are photographs 10, 50 and 60 of different views of an antique chicken bowl. The images can also be constructed from high-spectral data, holographic data, optic scan data, X-rays scan data, computed tomography (CT) scan data, and the likes. Generally, all the information is acquired to uniquely identify the physical object, which includes metadata such as descriptive metadata, structural metadata, administrative metadata, reference metadata, and/or legal metadata. The digital representation includes a data structure that uniquely identity the physical object. The digital representation can be of a multimodal digital identity of the physical object. The multimodal digital identity construction of the physical object may be subjected to three-dimensional model construction from multimodal data such as high-spectral data, holographic data, optic scan data, X-rays scan data, and/or CT scan data of the physical object. In some embodiments, the digital representation also includes a unique identifier distributed in the blockchain ledgers.

Once the digital representation of the physical object is generated and available, the computing devices partitions the digital representation of the physical object into a plurality of pieces based on instructions at operation 220. The instructions may include how many pieces into which the digital representation is partitioned, partitioning patterns (e.g., structures and/or designs on the physical object) and sizes, and so on. Each piece of the digital representation uniquely represents a respective portion of the physical object. In other words, a piece of the digital representation is one-to-one corresponding to the respective portion of the physical object only. Taking photograph 10 of FIG. 2 as an example, dotted lines 11, 12 and 13 partition a digital representation 10 of the antique chicken bowl into five (5) digital pieces 21, 22, 23, 24 and 25 based on the unique features of the antique chicken bowl. For example, each of the digital pieces 21 and 23 contains a different painted chicken, and each of the digital pieces 22 and 24 includes different painted flowers, while the digital piece 25 has a seal. Each of the five digital pieces 21, 22, 23, 24 and 25 of the digital representation 10 is uniquely corresponding to a respective physical portion of the antique chicken bowl, respectively. It should be noted that the partition, segmentation or fragmentation of the digital representation into the plurality of pieces virtually divides the digital representation of the physical object into the plurality of digital piece assets based on the instructions, and does not physically divide the physical object.

At operation 230, a plurality of digital tokens for the plurality of pieces of the digital representation is generated, wherein each digital token includes a token identifier that is associated uniquely with a respective piece of the digital representation. The generation of the digital tokens usually involves using a smart contract to mint the digital tokens on a chosen blockchain, which acts as a distributed ledger, and storing the digital tokens on the distributed ledger. Minting refers to the process of creating the unique digital tokens each of which represents a digital asset, i.e., a piece of the digital representation. This typically involves providing the necessary details and metadata for the digital tokens, such as the title, description, image or media file, and any other relevant information. Once minted, the digital tokens are stored on the distributed ledger. The blockchain ensures that the ownership and transaction history of the digital tokens are securely recorded and verifiable. In some embodiments, the smart contract defines, among other things, the rules and functionality of digital tokens, including ownership, transferability, royalties, and any additional attributes or metadata.

According to the invention, each digital token is a non-fungible token (NFT). Generally, the term "digital token(s)" or simply "token(s)", used in the disclosure, refers to NFTs only, and do not include fungible tokens. The digital tokens are tradable, transferable and/or redeemable. Whenever the tokens are traded, transferred and/or redeemed, the ownership of the respective pieces of the digital representation associated with the tokens is changed in the distributed ledger.

At operation 240, each digital token is cryptographically linked to the respective piece of the digital representation of the physical object on a distributed ledger, such that each digital token represents the respective piece of the digital representation of the physical object; and associating ownership of each digital token to an account of an owner of the respective piece of the digital representation of the physical object on the distributed ledger.

In some embodiments, cryptographically linking an NFT to a respective piece of the digital representation of the physical object on the at least one distributed ledger involves associating the unique identifier or token ID of each digital token with the corresponding entry in the smart contract. This linkage establishes the connection between each digital token and the distributed ledger. With the digital tokens linked to the distributed ledger, users can buy, sell, trade, or transfer ownership of the digital tokens through interactions with the smart contract. These interactions are typically executed through blockchain wallets or NFT marketplaces.

In some embodiments, one unique feature of the invention is that a digital token is one-to-one-only cryptographically linked to a respective piece of the digital representation of the physical object, and vice versus. That is, a digital token is cryptographically linked to only one single piece of the digital representation, and alternatively, a piece of the digital representation is tokenized with only one single digital token. Such a unique feature ensures each piece of the digital representation can only have a single ownership represented by its unique digital token at the same time, and avoids a single piece of the digital representation to have multiple ownerships at the same time, which ensures the ownership and control of each piece of the digital representation correspond to the ownership and control of the respective portion of the physical object.

In some embodiments, the method 200 further comprises transferring the ownership of one or more pieces of the digital representation of the physical object from a first party to a second party.

Figure 4:
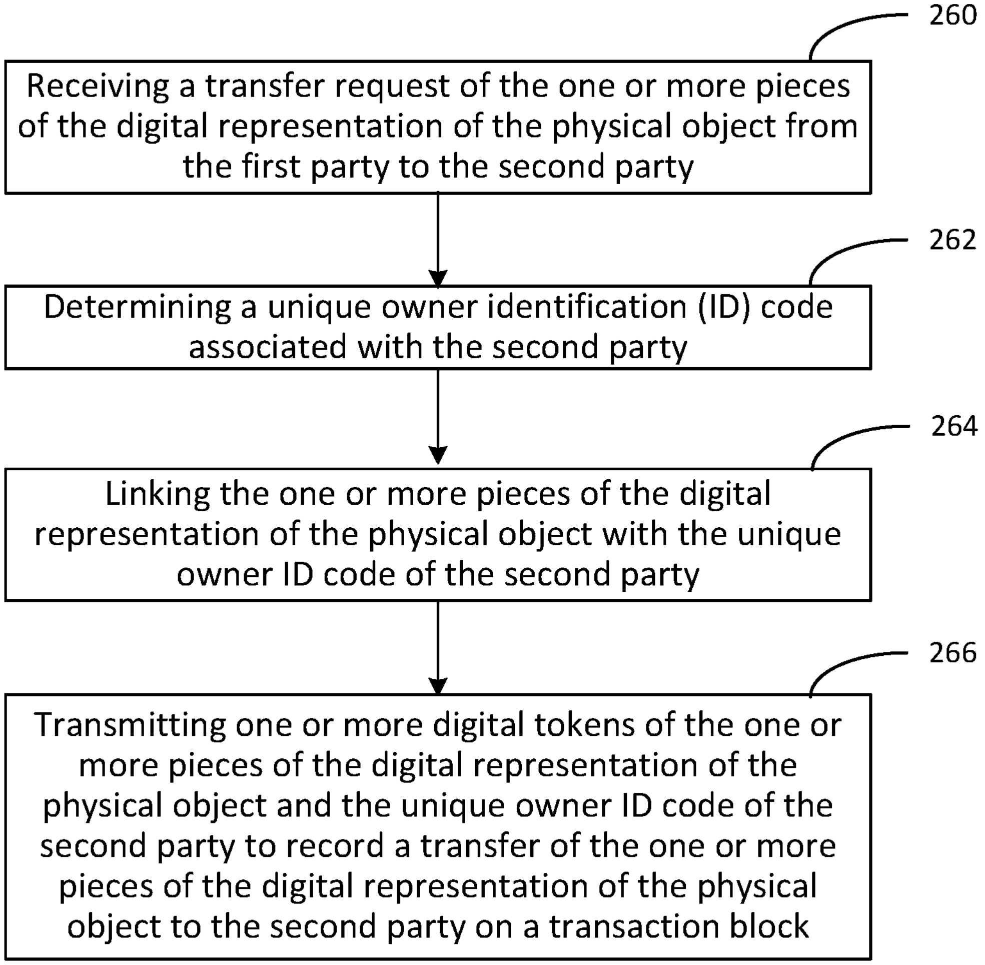
FIG. 4 shows a schematic diagram of a system for generation and distribution of digital collectibles of a physical object over a distributed computing network according to embodiments of the invention.

Referring to FIG. 4, the said transferring the ownership of the one or more pieces of the digital representation of the physical object comprises the following operations. At operation 260, a transfer request of the one or more pieces of the digital representation of the physical object from the first party to the second party is received. In one embodiment, the transfer request includes one or more token identifiers that identify the one or more digital tokens and a public address of the requester. At operation 262, a unique owner identification (ID) code associated with the second party is determined. At operation 264, the one or more pieces of the digital representation of the physical object are linked with the unique owner ID code of the second party. At operation 266, one or more digital tokens of the one or more pieces of the digital representation of the physical object and the unique owner ID code of the second party is transmitted to record a transfer of the one or more pieces of the digital representation of the physical object to the second party on a transaction block.

In some embodiments, said transferring the ownership of the one or more pieces of the digital representation of the physical object further comprises updating the distributed ledger with the transaction block that includes the ownership indicating that the one or more digital tokens corresponding to the one or more pieces of the digital representation of the physical object are owned by the second party in response to the transfer.

In some embodiments, the method further comprises generating a smart contract that governs ownership of the plurality of digital tokens in connection with the plurality of pieces of the digital representation.

In some embodiments, the smart contract defines the rules and conditions of which a digital token is one-to-one-only cryptographically linked to a respective piece of the digital representation of the physical object, and vice versus. That is, a digital token is cryptographically linked to only one single piece of the digital representation, and alternatively, a piece of the digital representation is tokenized with only one digital token. Such a unique feature ensures each piece of the digital representation can only have a single ownership represented by its unique digital token at the same time, and avoids a single piece of the digital representation to have multiple ownerships at the same time, which ensures the ownership and control of each piece of the digital representation correspond to the ownership and control of the respective portion of the physical object. This is distinctly different from the existing NFT market on which each piece of assets is tokenized with multiple NFTs, i.e., each piece of assets can have multiple ownerships. The unique one-to-one-only correspondence between a digital taken and a respective piece of the digital representation of the physical object according to the invention is particularly relevance for a collectible physical object. For example, if someone wants to physically possess the collectible physical object, he/she needs to purchase all the digital tokens associated with each and every piece of the digital representation of the physical object, and then redeems the digital tokens to take a possession of the physical object.

In some embodiments, the smart contract defines whether the one or more pieces of the digital representation are transferable from the first party to the second party, if the smart contract allows transfers of the one or more pieces of the digital representation, the smart contract further includes one or more conditions that when met, cause the smart contract to initiate a transfer of the one or more pieces of the digital representation from the first party to the second party.

In some embodiments, the smart contract updates the distributed ledger to indicate a change in the ownership of the one or more pieces of the digital representation in response to the one or more conditions being met.

In some embodiments, the smart contract updates the ownership of the one or more digital tokens on the distributed ledger to assign the one or more digital tokens to an account of the second party of the one or more pieces of the digital representation in response to the transfer.

In some embodiments, the plurality of digital tokens is redeemable by an owner of the plurality of pieces of the digital representation once the owner purchases all the plurality of pieces of the digital representation, whereby redemption of the plurality of digital tokens allows the owner of the plurality of pieces of the digital representation to physically take possession of the physical object.

In some embodiments, the method further comprises providing, by a digital market platform, a graphical user interface (GUI) for parties to view visualizations of the digital representation of the physical object; and transact for one or more pieces of the digital representation by purchasing one or more digital tokens of the plurality of digital tokens corresponding to one or more pieces of the digital representation.

In one embodiment, said purchasing one or more digital tokens of the plurality of digital tokens is through auction, push notifications, and/or websites.

Aspects of this invention may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present invention may be practiced with a variety of computer-system and computer-network configurations, including multiprocessor systems, microprocessor-based or programmable-consumer electronics, minicomputers, mainframe computers, and the like. In addition, aspects of the present invention may be practiced in distributed-computing environments where tasks are performed by resident and remote-processing devices that are linked through a communications network. In a distributed-computing environment, program modules may be located in both local and remote computer-storage media including memory storage devices. Aspects of the present invention may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications, and various publications, are cited and discussed in the description of this invention. The citation and/or discussion of such references is provided merely to clarify the description of the invention and is not an admission that any such reference is “prior art” to the invention described herein. All references cited and discussed in this specification are incorporated herein by reference in their entireties and to the same extent as if each reference was individually incorporated by reference.

What is claimed is:

1. A system for generation and distribution of digital collectibles of a physical object over a distributed computing network, comprising:

at least one distributed ledger; and one or more computing devices operably coupled to the at least one distributed ledger, and configured to:

generate a digital representation of the single unique non-fungible physical object, wherein generating the digital representation comprises generating the digital representation based on one or more different imaging modalities selected from the group consisting of high-spectral imaging data, holographic data, optic scan data, X-ray scan data and computed tomography (CT) scan data of the physical object, and wherein generating the digital representation further comprises generating metadata uniquely identifying physical attributes, origination attributes, creator attributes, provenance history, and a GPS position of the physical object;

partition the digital representation of the single unique physical object by:

detecting a set of inherent visual or structural features of the physical object each corresponding to a distinct physical portion of the single physical object, and dividing the digital representation into a plurality of discrete digital pieces each corresponding uniquely and exclusively to one of the inherent visual or structural features of the physical object representation such that the physical object remains intact in secure custody;

generate a plurality of non-fungible tokens (NFTs) for the plurality of discrete digital pieces of the digital representation, wherein generating the plurality of NFTs comprises generating a token identifier for each NFT and cryptographically binding the token identifier in a strict one-to-one-only relationship with exactly one respective discrete digital piece;

store, on the at least one distributed ledger:

a plurality of public addresses, each respective public address corresponding to a respective account of a respective user;

the plurality of discrete digital pieces of the digital representation of the single physical object; and the plurality of NFTs corresponding to the plurality of discrete digital pieces with their strict one-to-one-only cryptographic bindings and ownership records;

cryptographically link each NFT to its respective discrete digital piece of the digital representation on the at least one distributed ledger such that ownership of each NFT represents exclusive ownership of the respective distinct physical portion of the single physical object; and associate ownership of each NFT to an account of an owner of the respective discrete digital piece on the at least one distributed ledger, redeeming all NFTs corresponding to all discrete digital pieces of the digital representation of the single physical object by determining that the complete set of NFTs is owned by a single party and allowing the single party to take possession of the entire single physical object based on the determination.

2. The system of claim 1, wherein the one or more computing devices are further configured to transfer the ownership of one or more pieces of the digital representation of the physical object from a first party to a second party.

3. The system of claim 2, wherein the one or more computing devices are further configured to:

receive a transfer request of the one or more pieces of the digital representation of the physical object from the first party to the second party;

determine a unique owner identification (ID) code associated with the second party;

link the one or more pieces of the digital representation of the physical object with the unique owner ID code of the second party; and transmit one or more digital tokens of the one or more pieces of the digital representation of the physical object and the unique owner ID code of the second party to record a transfer of the one or more pieces of the digital representation of the physical object to the second party on a transaction block.

4. The system of claim 3, wherein the transfer request includes one or more token identifiers that identify the one or more digital tokens and a public address of the requester.

5. The system of claim 3, wherein the one or more computing devices are further configured to update the at least one distributed ledger with the transaction block that includes the ownership indicating that the one or more digital tokens corresponding to the one or more pieces of the digital representation of the physical object are owned by the second party in response to the transfer.

6. The system of claim 3, wherein the one or more computing devices are further configured to generate a smart contract that governs the ownership of each of the plurality of digital tokens in connection with the plurality of pieces of the digital representation.

7. The system of claim 6, wherein the smart contract defines whether the one or more pieces of the digital representation are transferable from the first party to the second party, if the smart contract allows a transfer of the one or more pieces of the digital representation, the smart contract further includes one or more conditions that when met, cause the smart contract to initiate the transfer of the one or more pieces of the digital representation from the first party to the second party.

8. The system of claim 7, wherein the smart contract updates the at least one distributed ledger to indicate a change in the ownership of the one or more pieces of the digital representation in response to the one or more conditions being met.

9. The system of claim 8, wherein the smart contract updates the ownership of the one or more digital tokens on the at least one distributed ledger to assign the one or more digital tokens to an account of the second party of the one or more pieces of the digital representation in response to the transfer.

10. The system of claim 1, wherein the one or more computing devices comprise an object management system configured to generate the digital representation of the physical object based on the information of the physical object.

11. The system of claim 1, wherein the one or more computing devices comprise a digital token generation system configured to:

generate the plurality of digital tokens for the plurality of pieces of the digital representation; and generate a cryptographic link of each digital token to the respective piece of the digital representation of the physical object on the at least one distributed ledger, such that each digital token represents the respective piece of the digital representation of the physical object.

12. The system of claim 1, wherein the one or more computing devices comprise a ledger update system configured to write the plurality of digital tokens to the at least one distributed ledger in accordance with a protocol, thereby facilitating transactions for the plurality of pieces of the digital representation of the physical object using the plurality of digital tokens.

13. The system of claim 12, further comprising a digital market platform configured to facilitate transactions for one or more of the plurality of digital tokens on behalf of sellers and to instruct the ledger update system to update the ownership of the one or more of the plurality of digital tokens in response to the transactions.

14. The system of claim 13, wherein the digital market platform comprises a graphical user interface (GUI) for parties to view visualizations of the digital representation of the physical object; and transact for one or more pieces of the digital representation by purchasing one or more digital tokens of the plurality of digital tokens corresponding to one or more pieces of the digital representation.

15. The system of claim 14, wherein said purchasing one or more digital tokens of the plurality of digital tokens is through an auction, push notifications, and/or websites.

16. The system of claim 1, wherein the at least one distributed ledger is maintained by the one or more computer devices.

17. The system of claim 16, wherein the at least one distributed ledger is a blockchain, wherein the blockchain is a private blockchain or a public blockchain.

18. The system of claim 1, wherein the physical object is a physical good, a collectible artwork, or an antique.

19. A method for generation and distribution of digital collectibles of a physical object over a distributed computing network, comprising:

generating a digital representation of the single unique non-fungible physical object, wherein generating the digital representation comprises generating the digital representation based on one or more different imaging modalities selected from the group consisting of high-spectral imaging data, holographic data, optic scan data, X-ray scan data and computed tomography (CT) scan data of the physical object, and wherein generating the digital representation further comprises generating metadata uniquely identifying physical attributes, origination attributes, creator attributes, provenance history, and a GPS position of the physical object;

partitioning the digital representation of the single unique physical object by:

detecting a set of inherent visual or structural features of the physical object each corresponding to a distinct physical portion of the single physical object, and detecting a set of inherent visual or structural features of the physical object each corresponding to a distinct physical portion of the single physical object, and dividing the digital representation into a plurality of discrete digital pieces each corresponding uniquely and exclusively to one of the inherent visual or structural features of the physical object, and wherein the partitioning does not physically divide the physical object but virtually segments the digital representation such that the physical object remains intact in secure custody;

generating a plurality of non-fungible tokens (NFTs) for the plurality of discrete digital pieces of the digital representation, wherein generating the plurality of NFTs comprises generating a token identifier for each NFT and cryptographically binding the token identifier in a strict one-to-one-only relationship with exactly one respective discrete digital piece;

storing, on the at least one distributed ledger:

a plurality of public addresses, each respective public address corresponding to a respective account of a respective user;

the plurality of discrete digital pieces of the digital representation of the single physical object; and the plurality of NFTs corresponding to the plurality of discrete digital pieces with their strict one-to-one-only cryptographic bindings and ownership records;

cryptographically linking each NFT to its respective discrete digital piece of the digital representation on the at least one distributed ledger such that ownership of each NFT represents exclusive ownership of the respective distinct physical portion of the single physical object; and associating ownership of each NFT to an account of an owner of the respective discrete digital piece on the at least one distributed ledger, redeeming all NFTs corresponding to all discrete digital pieces of the digital representation of the single physical object by determining that the complete set of NFTs is owned by a single party and allowing the single party to take possession of the entire single physical object based on the determination.

20. The method of claim 19, further comprising transferring the ownership of one or more pieces of the digital representation of the physical object from a first party to a second party.

21. The method of claim 20, wherein said transferring the ownership of the one or more pieces of the digital representation of the physical object comprises:

receiving a transfer request of the one or more pieces of the digital representation of the physical object from the first party to the second party;

determining a unique owner identification (ID) code associated with the second party;

linking the one or more pieces of the digital representation of the physical object with the unique owner ID code of the second party; and transmitting one or more digital tokens of the one or more pieces of the digital representation of the physical object and the unique owner ID code of the second party to record a transfer of the one or more pieces of the digital representation of the physical object to the second party on a transaction block.

22. The method of claim 21, wherein the transfer request includes one or more token identifiers that identify the one or more digital tokens and a public address of the requester.

23. The method of claim 21, wherein said transferring the ownership of the one or more pieces of the digital representation of the physical object further comprises updating the distributed ledger with the transaction block that includes the ownership indicating that the one or more digital tokens corresponding to the one or more pieces of the digital representation of the physical object are owned by the second party in response to the transfer.

24. The method of claim 21, further comprising generating a smart contract that governs ownership of the plurality of digital tokens in connection with the plurality of pieces of the digital representation.

25. The method of claim 24, wherein the smart contract defines whether the one or more pieces of the digital representation are transferable from the first party to the second party, if the smart contract allows a transfer of the one or more pieces of the digital representation, the smart contract further includes one or more conditions that when met, cause the smart contract to initiate the transfer of the one or more pieces of the digital representation from the first party to the second party.

26. The method of claim 25, wherein the smart contract updates the distributed ledger to indicate a change in the ownership of the one or more pieces of the digital representation in response to the one or more conditions being met.

27. The method of claim 26, wherein the smart contract updates the ownership of the one or more digital tokens on the distributed ledger to assign the one or more digital tokens to an account of the second party of the one or more pieces of the digital representation in response to the transfer.

28. The method of claim 19, further comprising providing, by a digital market platform, a graphical user interface (GUI) for parties to view visualizations of the digital representation of the physical object; and transact for one or more pieces of the digital representation by purchasing one or more digital tokens of the plurality of digital tokens corresponding to one or more pieces of the digital representation.

29. The method of claim 28, wherein said purchasing one or more digital tokens of the plurality of digital tokens is through auction, push notifications, and/or websites.

30. The method of claim 19, wherein the distributed ledger is configured to store a plurality of public addresses, each respective public address corresponding to a respective account of a respective user; the plurality of pieces of the digital representation of the physical objects; and the plurality of digital tokens corresponding to the plurality of pieces of the digital representation, and ownership of each respective token.

31. The method of claim 19, wherein the distributed ledger is maintained by the one or more computer devices.

32. The method of claim 31, wherein the distributed ledger is a blockchain, wherein the blockchain is a private blockchain or a public blockchain.

33. The method of claim 19, wherein the physical object is a physical good, a collectible artwork, or an antique.

34. A non-transitory tangible computer-readable medium storing instructions which, when executed by one or more processors, cause one or more computing devices to perform the method of claim 19 for generation and distribution of digital collectibles of a physical object over a distributed computing network.

* * * * *